(12) United States Patent
Chen

(10) Patent No.: US 7,222,869 B2
(45) Date of Patent: May 29, 2007

(54) STRUCTURE OF CROWN PORTION FOR BICYCLES

(76) Inventor: Hui Hsiung Chen, No. 34, Chia-Hou Rd., Liu-Feng Tsuen, Waipu Hsiang, Taichung Hsien (TW)

( * ) Notice: Subject to any disclaimer, the term of this patent is extended or adjusted under 35 U.S.C. 154(b) by 212 days.

(21) Appl. No.: 11/061,620

(22) Filed: Feb. 22, 2005

(65) Prior Publication Data
US 2006/0186632 A1    Aug. 24, 2006

(51) Int. Cl.
*B62K 1/00* (2006.01)
(52) U.S. Cl. ...................... 280/280; 280/276
(58) Field of Classification Search ............... 280/280, 280/276, 279
See application file for complete search history.

(56) References Cited
U.S. PATENT DOCUMENTS 6,095,542 A * 8/2000 Allen .................. 280/276
RE38,669 E * 12/2004 Voss et al. .................. 280/276
2005/0140114 A1* 6/2005 Lederer ....................... 280/280

* cited by examiner

*Primary Examiner*—Tony Winner
(74) *Attorney, Agent, or Firm*—Bacon & Thomas PLLC

(57) ABSTRACT

A crown portion for bicycles includes a first tube through which the steerer tube of a front fork extends, and two arms which are connected to the first tube and two second tubes are respectively connected to two distal ends of the two arms so that two leg portions of the front fork extend through the second tubes. Two passages are defined through each of the two arms and a separation ridge is located between the two passages to maintain the structural strength of the arms. The two passages communicate with the first tube so as to define two openings in an inner periphery of the first tube, and communicating with the second tubes so as to define two openings in an inner periphery of the second tubes at the conjunction of the second tubes and the arms.

4 Claims, 8 Drawing Sheets

G-G VIEW

B-B VIEW

CONDITIONS OF TEST UNDER STRESS

| | FORCE APPLIED PER UNIT AREA N/mm^2 | WEIGHT G |
|---|---|---|
| PRESENT INVENTION | 186 | 237 |
| CONVENTIONAL SPECFICATION | 495 | 266 |
| *The less force applied per unit are the stronger the object** | | |

STRUCTURE OF CROWN PORTION FOR BICYCLES

FIELD OF THE INVENTION

The present invention relates to a crown portion of less weight for bicycles and includes passages defined in the two side arms of the crown portion.

BACKGROUND OF THE INVENTION

A conventional crown portion 40 for bicycles is disclosed in FIGS. 7 and 8, and generally includes a first tube 42 defined in a center thereof so that a steerer tube of a front fork (both not shown) extends through the first tube 42, and two arms 41 are connected to the first tube 42. Each arm 41 has a second tube 43 connected to a distal end thereof so that two leg portions (not shown) of the front fork extend through the two first tubes 42. It is noted that the arms 41 are solid and complained by the users of their weight. Another crown portion is disclosed in FIG. 9 and a hole is drilled from outside of the second tubes 43 on the two arms 41 and extended to the first tube 42. The hole defines an opening 46 in the outside of each of the second tubes 43 and a through hole 47 is defined in communication between the first and second tubes 42, 43. A positioning plate 48 has to be put in the conjunction of each arm 41 and each second tube 43 to position the leg portions 49 extending through the second tubes 43. The positioning plates 48 are fixed by two bolts 481 which extend through the arms 41 and are connected to the positioning plates 48. There are several shortcomings in the conventional crown portion. Firstly, the openings 46 in the second tubes 43 weaken the structural strength of the second tubes 43 and the manufacturers have to cover the openings 46 by extra processes. Secondly, the arms 41 have to be further drilled with a hole for the bolts 481 to extend and the holes for the bolts 481 often crack during severe actions of the bicycles. Thirdly, it takes a lot of time to put the positioning plates 48 in the second tubes 43.

The present invention intends to provide a crown portion for bicycles wherein the arms includes at least two passages which are in communication between the first and second tubes so that the weight of the crown portion is reduced while the structural strength is maintained.

SUMMARY OF THE INVENTION

The present invention relates to a crown portion for bicycles and the crown portion includes a first tube with a first hole defined axially therethrough, and two arms are connected to the first tube. Two second tubes are respectively connected to two distal ends of the two arms and each second tube has a second hole defined axially therethrough. Two passages are defined through each of the two arms and a separation ridge is located between the two passages. The two passages communicate with the first hole in the first tube so as to define two openings in an inner periphery of the first hole. The two passages communicate with the second holes in the two second tubes so as to define two openings in an inner periphery of the second holes at the conjunction of the second tubes and the arms.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
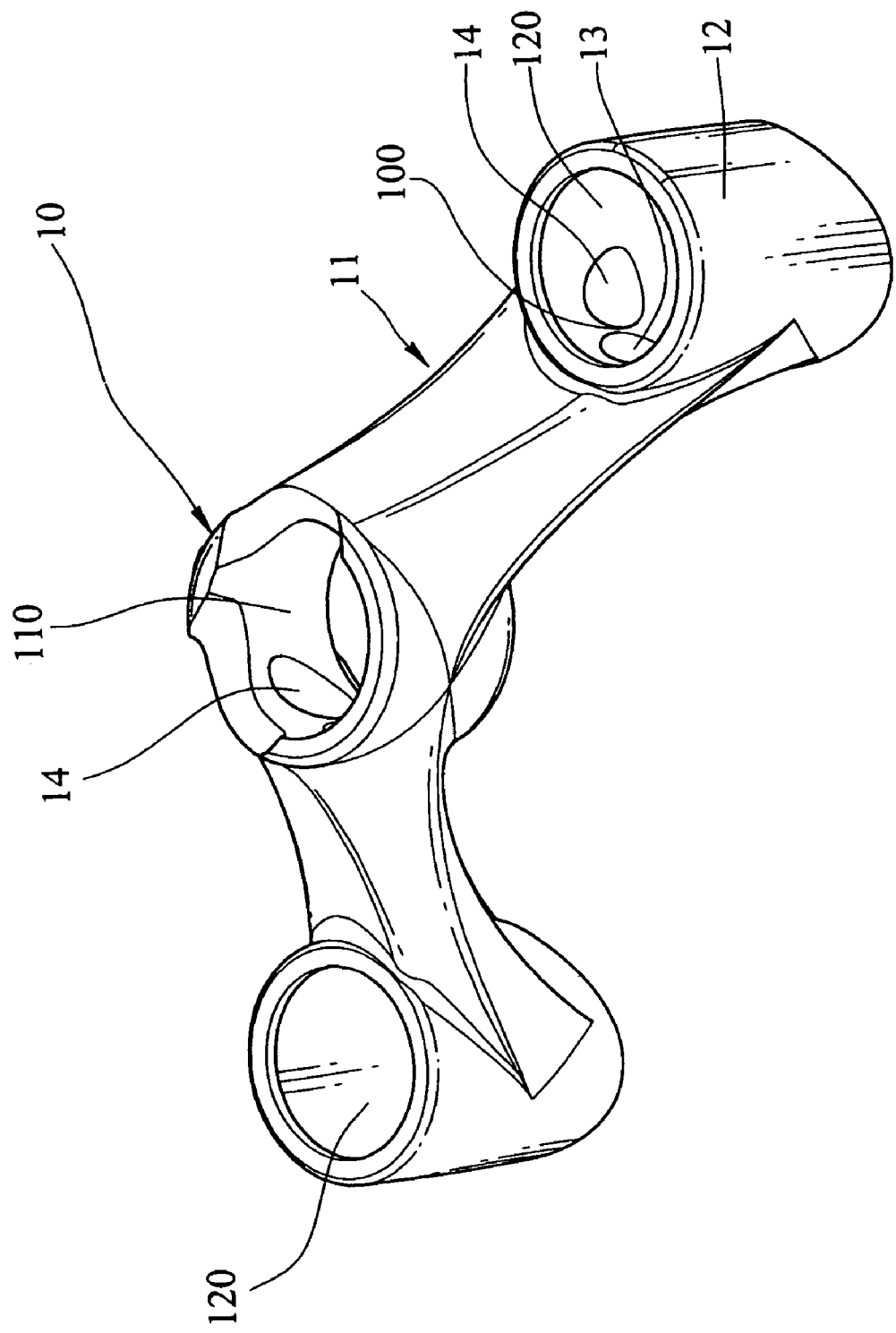
FIG. 1 is a perspective view to show the crown portion of the present invention.
Figure 2:
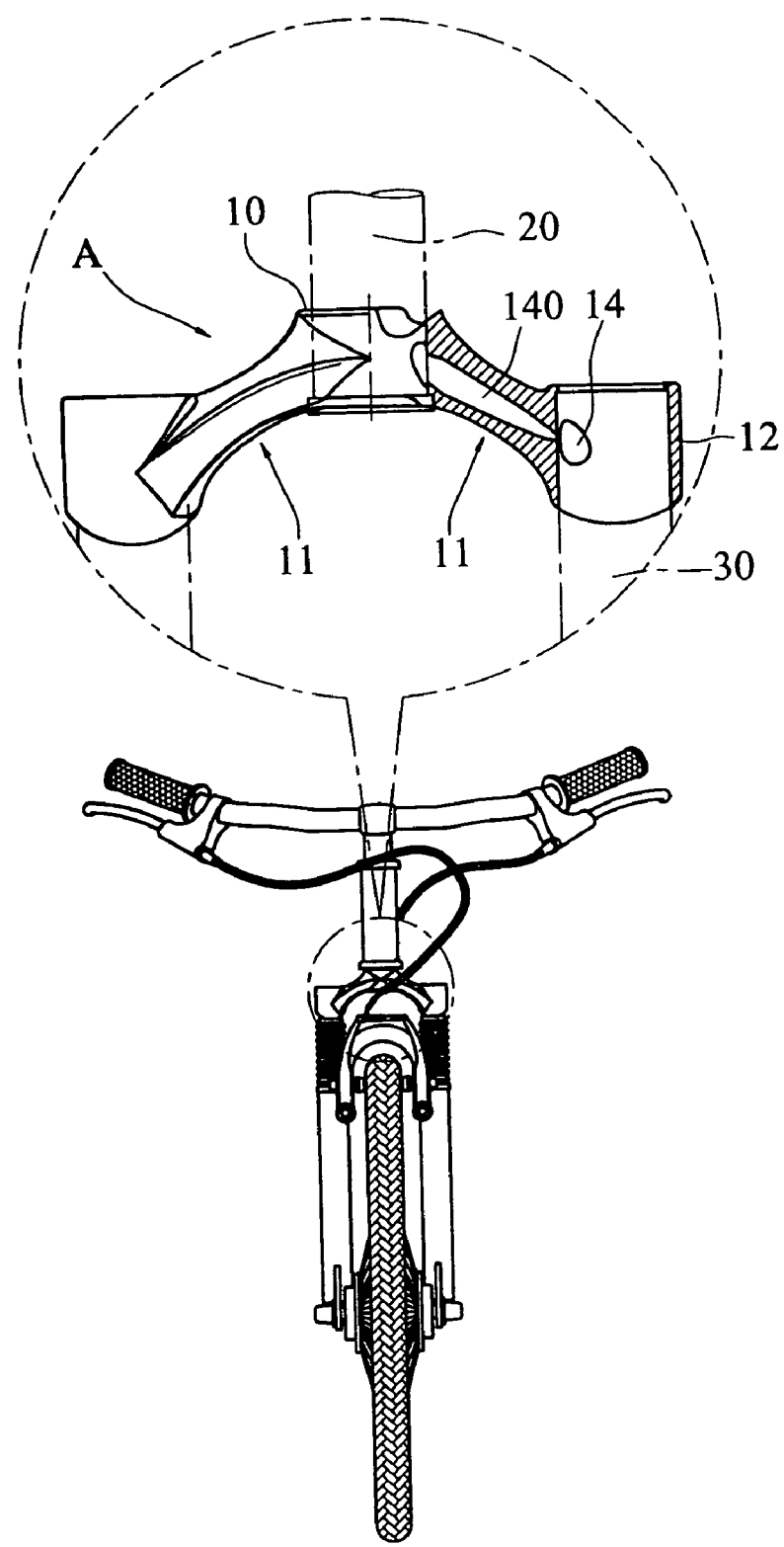
FIG. 2 shows the crown portion is used to a bicycle.
Figure 3:
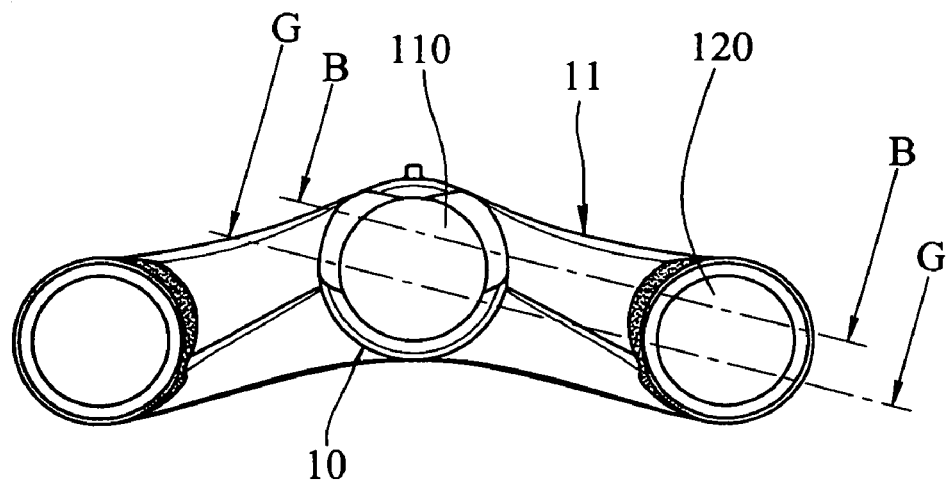
FIG. 3 shows a top view of the crown portion of the present invention.
Figure 4:
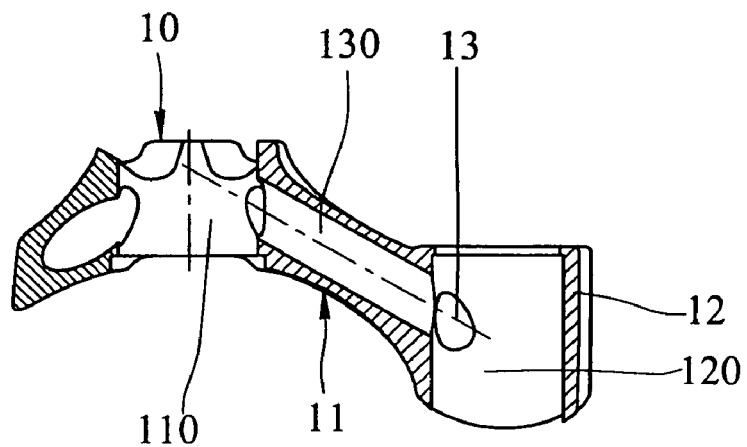
FIG. 4 shows a cross sectional view taken from line G—G in FIG. 3.
Figure 5:
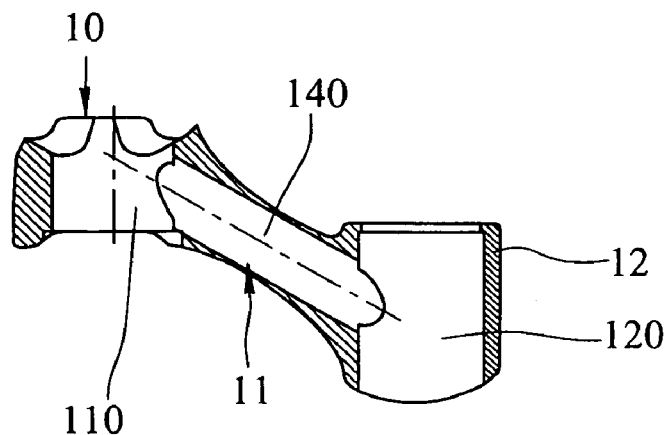
FIG. 5 shows a cross sectional view taken from line B—B in FIG. 3.

Referring to FIGS. 1 to 5, the crown portion of the present invention comprises a first tube 10 with a first hole 110 defined axially therethrough and two arms 11 are connected to the first tube 10. Two second tubes 12 are respectively connected to two distal ends of the two arms 11 and each second tube 12 has a second hole 210 defined axially therethrough. The steerer tube 20 of a front fork "A" as shown in FIG. 2, extends through the first hole 110 and the two leg portions 30 of the front fork "A" extend through the two second tubes 12.

Two passages 130, 140 are defined through each of the two arms 11 lengthwise and a separation ridge 100 is located between the two passages 130, 140. The two passages 130, 140 reduce the weight of the two arms 11 and the separation ridges 100 maintains the structural strength of the arms 11. The two passages 130, 140 communicate with the first hole 110 in the first tube 10 so as to define two openings 13, 14 in an inner periphery of the first hole 110, and the two passages 130, 140 communicate with the second holes 120 in the two second tubes 12 so as to define two openings 13, 14 in an inner periphery of the second holes 120 at the conjunction of the second tubes 12 and the arms 11.

The crown portion can be made by steps of casting, forging and then machined by CNC so that the shape of the arms 11 can be designed to include reinforcements to strengthen the structural strength. The two passages 130, 140 can be drilled from either the inner periphery of the first hole 110 or the second holes 120.

Figures 10, 11:
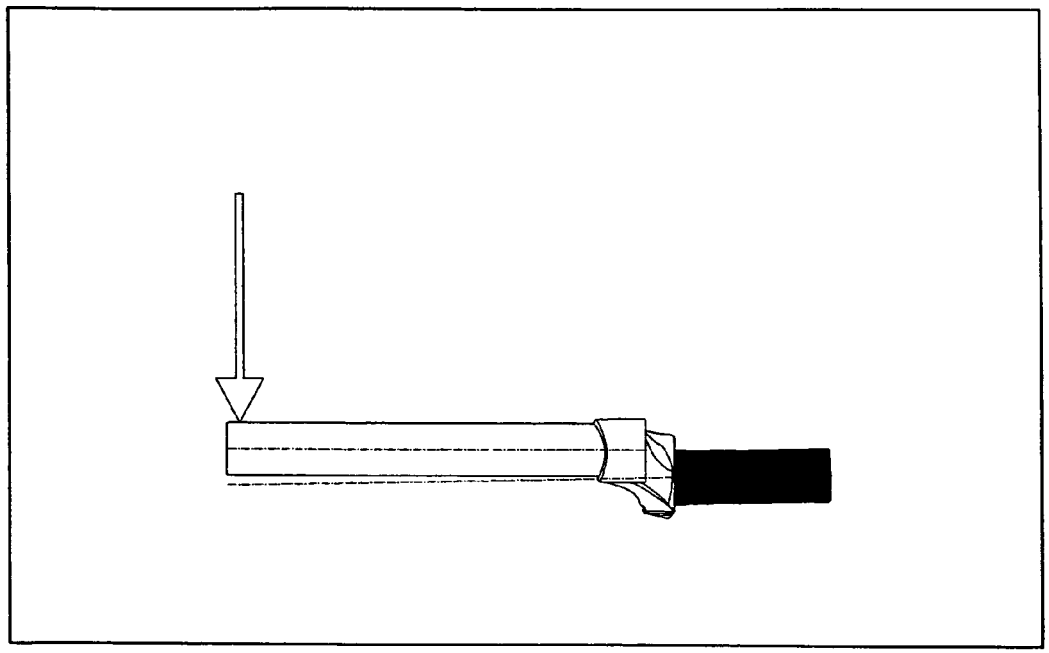
FIG. 10 shows a comparison between the crown portion of the present invention and the conventional crown portion.
FIG. 11 shows a diagram of a method of testing a crown portion under stress.

Referring to FIGS. 10 and 11, we can see that the crown portion of the present invention is light in weight compared with the conventional crown portion (237 g<266 g), and the stress applied on the arms 11 is less also for the crown portion of the present invention with regard to the conventional crown portion (186<485 N/mm$^2$).

Figure 6:
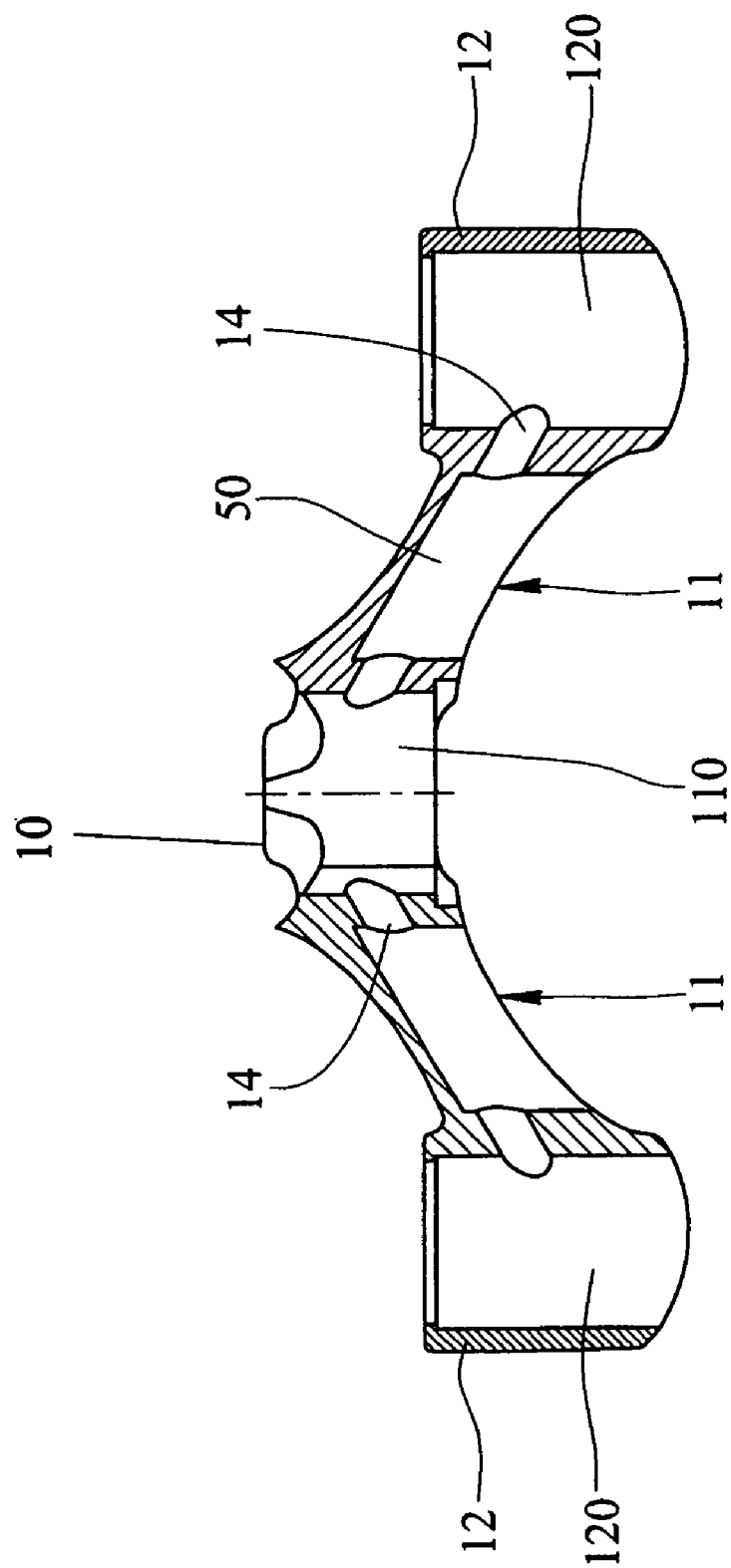
FIG. 6 shows another embodiment of the crown portion of the present invention.
Figure 7:
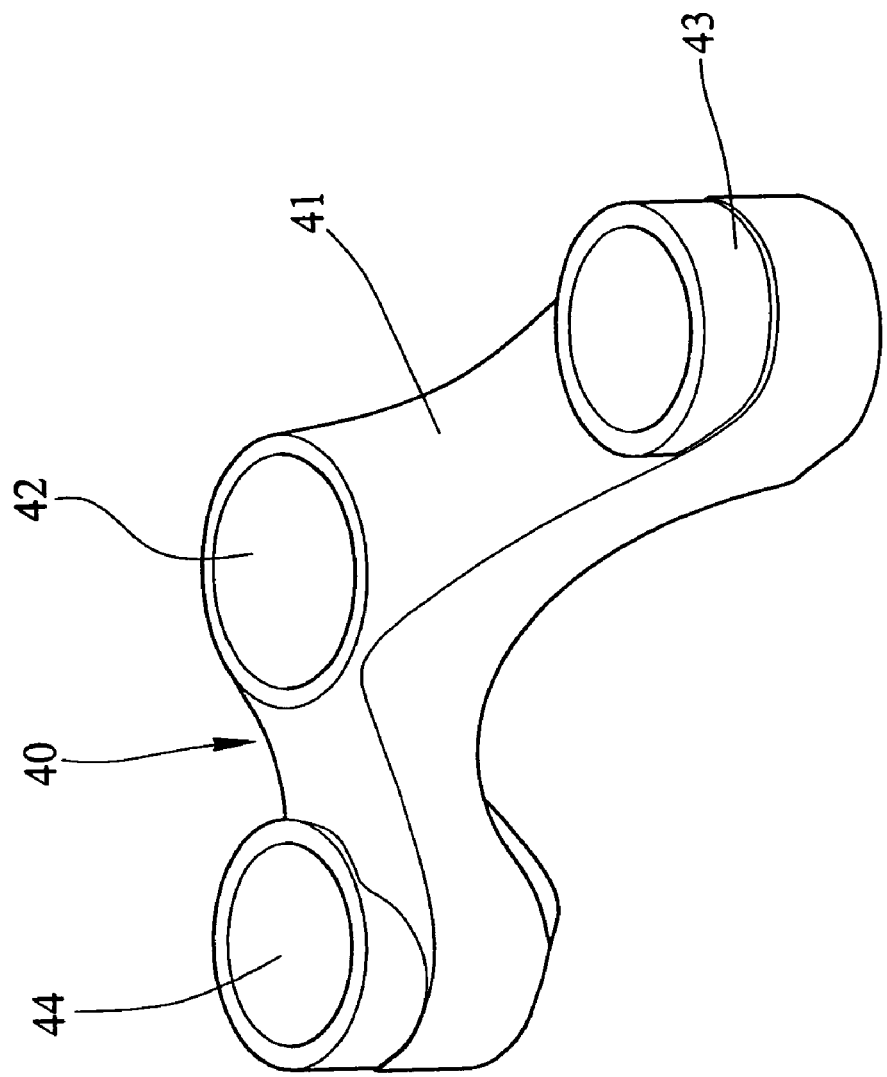
FIG. 7 shows a conventional crown portion.
Figure 8:
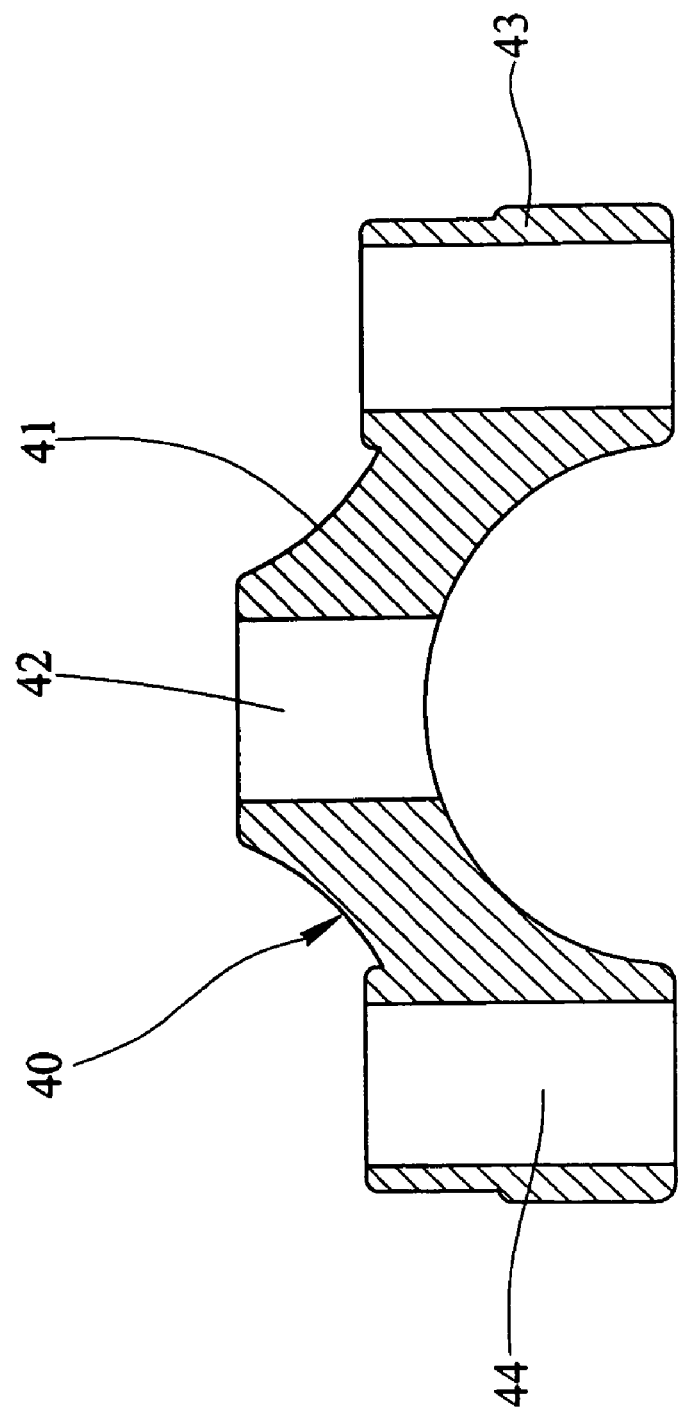
FIG. 8 shows a cross sectional view of the conventional crown portion.
Figure 9:
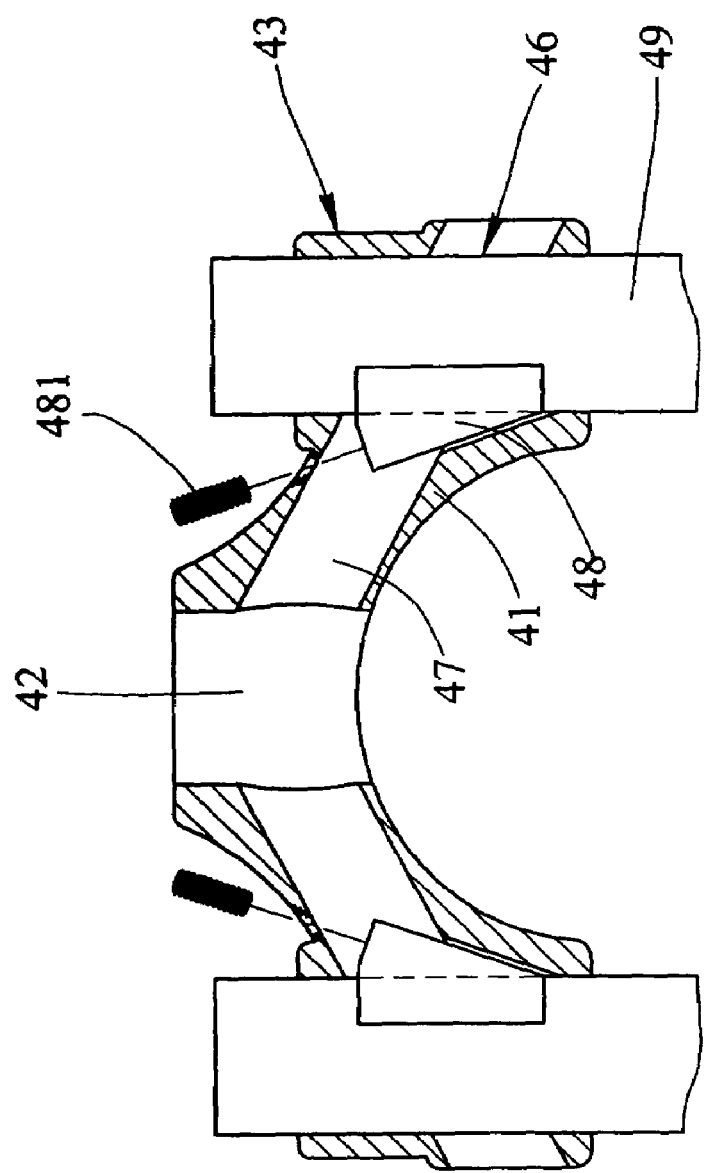
FIG. 9 shows another the conventional crown portion.

FIGS. 6 shows another embodiment of the present invention, wherein each of the two arms 11 has a recess 50 defined in a bottom of an outer periphery thereof. At least one of the two passages 130, 140 in each of the arms 11 communicates with the recess 50. The positions of the openings 13, 14 are located higher or on the same axis of the recess 50 depending on the requirements of the strength of the arms 11.

While we have shown and described the embodiment in accordance with the present invention, it should be clear to those skilled in the art that further embodiments may be made without departing from the scope of the present invention.

What is claimed is:

1. A crown portion for bicycles, comprising:

a first tube with a first hole defined axially therethrough, two arms connected to the first tube and two second tubes respectively connected to two distal ends of the two arms, each second tube having a second hole defined axially therethrough, and two passages defined through each of the two arms and a separation ridge located between the two passages, the two passages communicating with the first hole in the first tube so as to define two openings in an inner periphery of the first hole, the two passages communicating with the second holes in the two second tubes so as to define two openings in an inner periphery of the second holes at the conjunction of the second tubes and the arms.

2. The crown portion as claimed in claim 1, wherein each of the two arms has a recess defined in an outer periphery thereof.

3. The crown portion as claimed in claim 2, wherein one of the two passages in each of the arms communicates with the recess.

4. The crown portion as claimed in claim 2, wherein the recess is defined in a bottom of each arm.

* * * * *